M. HOUDAILLE.
HYDRAULIC BRAKE DEVICE.
APPLICATION FILED APR. 16, 1910.
1,141,246.
Patented June 1, 1915.
2 SHEETS—SHEET 1.
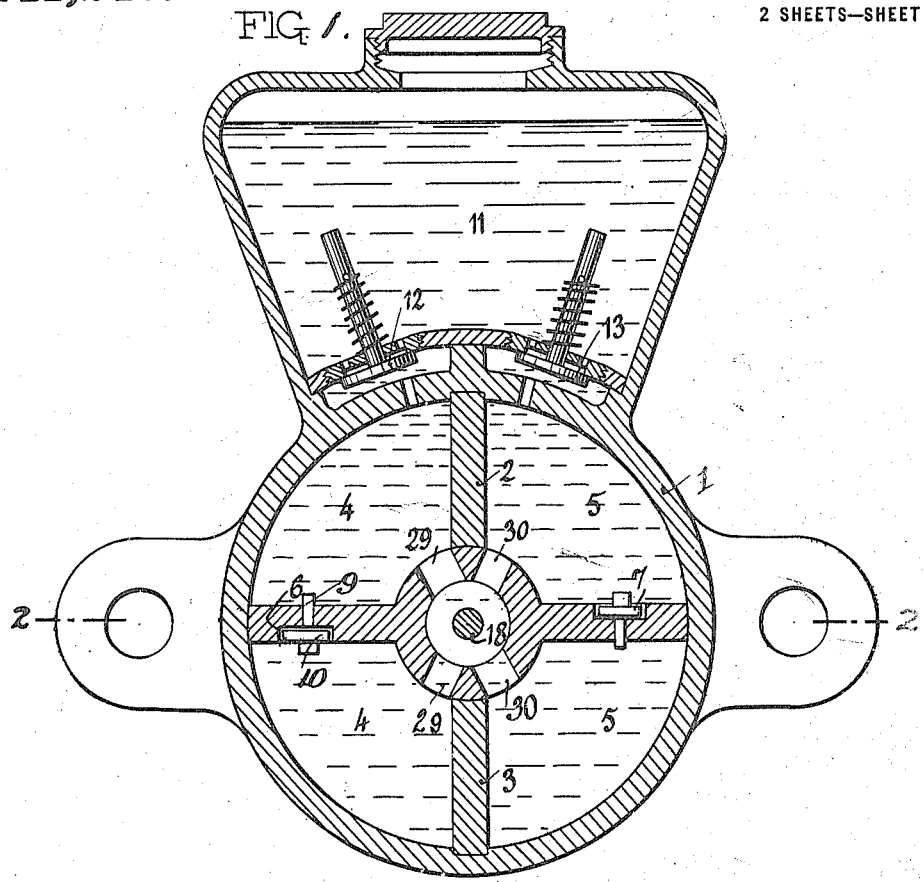
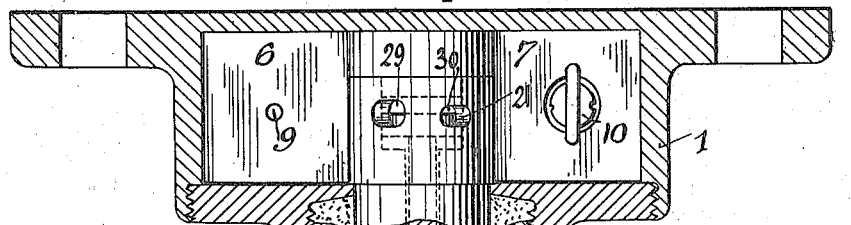
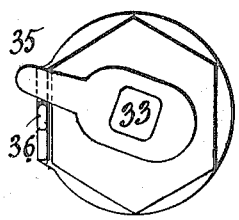
Witnesses
M. W. Darg.
R. A. Bakersmith.
Inventor:
Maurice Houdaille
By Wm. E. Boulter,
Attorney

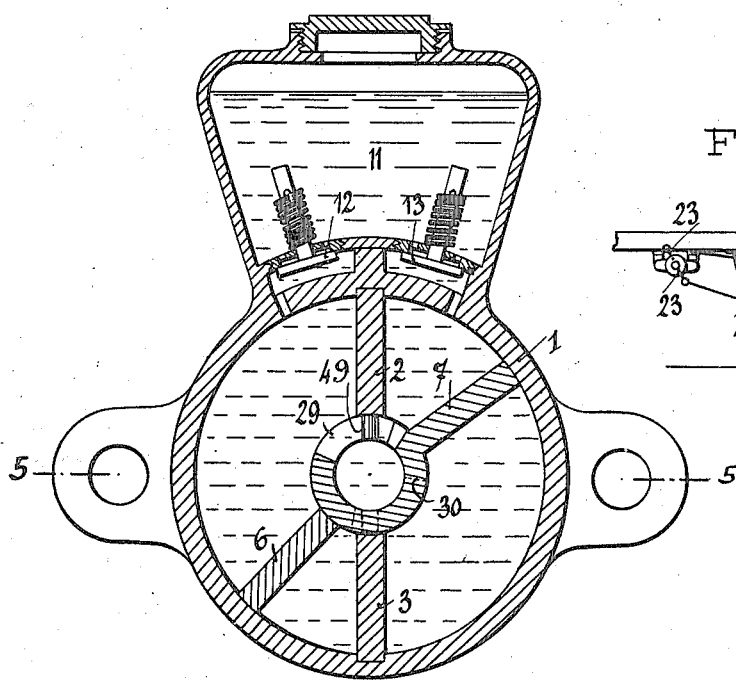
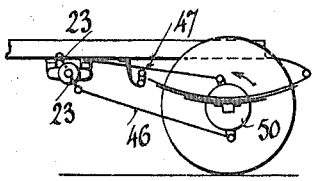
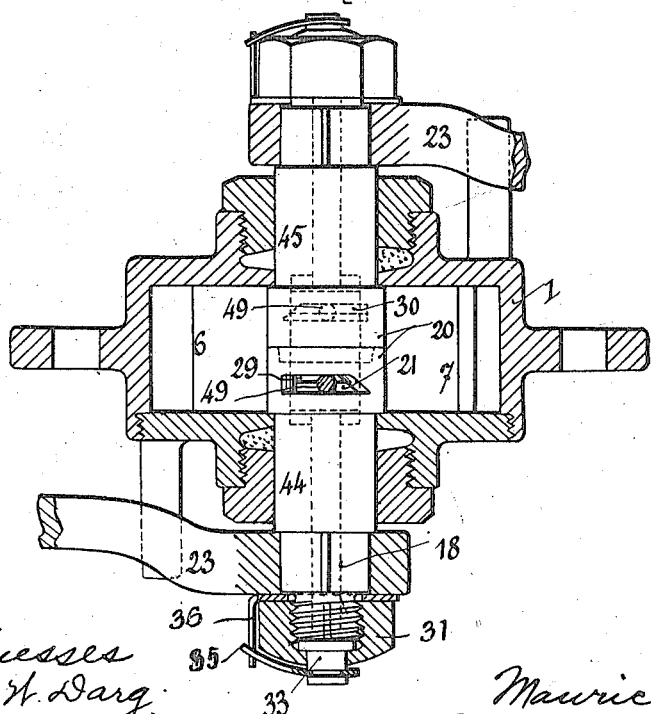

UNITED STATES PATENT OFFICE.

MAURICE HOUDAILLE, OF PARIS, FRANCE, ASSIGNOR TO SOCIETE HOUDAILLE & SABOT, OF PARIS, FRANCE.

HYDRAULIC BRAKE DEVICE.

1,141,246. Specification of Letters Patent. Patented June 1, 1915.

Application filed April 16, 1910. Serial No. 555,885.

*To all whom it may concern:*

Be it known that I, MAURICE HOUDAILLE, a citizen of the French Republic, residing in Paris, France, have invented a certain new and useful Improved Hydraulic Brake Device, of which the following is a specification.

This invention relates to a hydraulic brake device or shock absorber for vehicles, of the kind which is constituted by a liquid-tight casing filled with liquid and divided into compartments of variable volume by fixed partitions and rotary blades, in which casing the leakages are compensated by means of an auxiliary compensating tank provided with valves.

Compared to the devices of that kind hitherto known, the object of the invention is distinguished by the conduits for the intercommunication of the working compartments of the apparatus, being made with adjustable cross-sections and arranged at either side of one and the same regulating portion arranged in the spindle of the blades which move in the said compartments. This arrangement is such that it makes possible previous regulation of the hydraulic resistance of the conduits for the circulation of liquid, for a given initial load, and automatic variation of the said resistance during the working, the said resistance being greater in the direction of expansion than in that of the compression of the vehicle springs.

In the accompanying drawings given by way of example—Figure 1 is a vertical section, in front elevation, of a shock absorber according to this invention, with a single driving crank. Fig. 2 is a horizontal cross-section on the line 2—2 of Fig. 1. Fig. 3 shows in elevation the central portion of the apparatus shown in Figs. 1 and 2. Fig. 4 is a vertical sectional front elevation of a modified construction of the apparatus, comprising two cranks arranged respectively at each side of the casing and operating two single blades independent of each other. Fig. 5 is a horizontal cross-section on the line 5—5 of Fig. 4. Fig. 6 is an elevation showing diagrammatically the application of the shock absorber in Fig. 4 to a rear axle of a motor vehicle.

In its chief construction, the shock absorber according to this invention consists chiefly of a circular casing 1 divided into two compartments 4, 5 by two diametrically opposite radial partitions 2, 3. In the said compartments 4, 5 revolve blades 6, 7 arranged radially of a hollow rotary spindle or hub 8, one of the ends of which is pivoted in the central nipple of the bottom of the casing 1. The said spindle 8 passes through a stuffing box in the cover of the casing 1 and receives on its square end outside the casing, a crank 23 connecting the said spindle 8, by means of a rod or in some other way, to the movable body which it is desired to brake.

The blades 6, 7 can be provided respectively with orifices 9 closed by valves 10 which enable the liquid to circulate freely through the said blades in one direction of their movement of oscillation.

The compartments 4, 5 are filled with liquid, the leakages of which, that are liable to take place during the working, are compensated by corresponding quantities admitted from a tank 11 arranged at the upper portion of the apparatus. This tank 11 communicates with the two compartments 4 and 5 by means of orifices closed by valves 12, 13 which close automatically, in order to prevent any return of the liquid into the said tank.

According to this invention, the working compartments of a hydraulic shock absorber of the kind described, comprise intercommunicating conduits made in the rotary spindle carrying the blades, so that the said conduits make it possible to effect the preliminary regulation of the circulation of the liquid for a given initial load, and also to vary the progressive resistance of the said circulation, which is greater in one direction than in the other. To that end, the spindle 8 is provided with two transverse conduits 29, 30 made respectively through the compartments diametrically opposite in couples, one of which conduits has a greater cross-sectional area of passage than that of the other. The spindle 8 is longitudinally perforated at its center and receives in the said perforation a rod 18 provided with a head forming a piston 21. The said piston is situated and can travel in a recess of a corresponding diameter, provided in that portion of the spindle 8, through which pass the conduits 29 and 30. This rod 18 terminates at its end opposite the piston 21, in a screw-threaded portion which is screwed into a corresponding tapped hole made in the end of the spindle 8. This end of the rod 18 is provided with a slot coöperating with a tenon 34 terminating a screw driving rod 33 arranged and rotating with a tight joint in a nut 31 which is used for securing the crank 23 controlling the apparatus.

The rod 33 carries a finger 35, the movements of which are limited by a stop finger 36 which is secured by means of the nut 31 in a given position relatively to the crank 23.

By turning the rod 33 by means of the finger 35, the rod 18 is also turned and screwed into the spindle 8. This screwing results in bringing about a movement of the piston 21 which closes or uncovers to a greater or less extent the conduits 29, 30 through which the liquid passes from one compartment into the other, independently of the orifices 9. This function makes it possible, by regulating the cross-sectional area of passage of the conduits 29, 30 for a given initial load, to obtain the resistance to the circulation of the liquid, in proportion to the said load. Moreover, owing to the difference in section of the conduits 29, 30, there takes place automatically, during the working, a certain variation of the resistance.

In the construction shown in Figs. 1 and 2, the arrangements described in the foregoing, are applied to a shock-absorbing apparatus in which the active parts consist of two blades 6, 7 rigidly coupled at an angle of 180° to one and the same spindle 8, to which angular movement are given by means of a crank 23 connected to the movable part the oscillations of which it is desired to brake.

The construction shown in Figs. 4–6 applies to the braking of a movable body capable of oscillating and of moving transversely and longitudinally relatively to a support, such as for instance the axle with the differential gear of a motor vehicle relatively to the frame of the said vehicle. In the said application, it is necessary that the blades of this construction of hydraulic brake should be able to rotate independently of each other, in order to compensate for the differences of radius of the arcs of circle described by the ends of the cranks of the said device and by the opposite points of attachments of connecting rods connecting the said cranks to the movable body, the oscillations of which are to be braked. In this latter construction, the spindle of the apparatus is divided into two sections 44 and 45 arranged end to end, and on each of the hubs 20, 20 of the same is mounted a blade 6 or 7. The sections 44 and 45 are provided respectively with square portions on which are mounted the cranks 23, 23 connected by connecting rods 46, 47 to the diametrically opposite points of the axle of the differential (Fig. 6).

The orifices 29, 30 through which the liquid circulates in order to pass from one compartment to the other, have the shape of elongated circular ports, and through the said orifices pass pins 49 secured respectively to each of the fixed partitions 2, 3.

According to the aforesaid arrangement, when the axle 50 of the differential oscillates, at starting, in the direction of the arrow in Fig. 6, the cranks 23, 23 of the brake describe arcs of different length, owing to the difference between the radii of the points of attachment of the connecting rods 46, 47 to the axle 50, and the radii of the said cranks. The result is that the blades 6, 7 oscillate independently of each other, while contributing to the braking of the said movement of rotation of the axle. What has been considered for the braking of the movement in one direction, takes place also in the other direction, with the difference that the progressive return of the blades takes place more slowly, owing to the smaller section of passage of the ports 29, 30 at the side of the compartments corresponding to the return of the blades to their initial position.

The sections of spindle 44 and 45 comprise rods 18 with pistons for preliminary regulation. For the purpose of rendering the said regulation progressive, the orifices 29, 30 for the circulation of the liquid, are beveled on their small face at the side of the compartment corresponding to the advance of the blades. When the rod 18 is operated so as to move the piston 21, the orifices 29, 30 are more or less uncovered, according to the direction in which is turned the screw driving rod 33 effecting the said movement. The result of this arrangement of bevels on the orifices 29, 30, combined with the pins 48, 49, is that the cross section of the said orifices varies progressively during operation, as well as during the preliminary regulation operations, so that the conditions required for the said progressive variation are always complied with, whatever be the maximum strain the device has to brake, and for which it is adjusted.

What I claim as my invention and desire to secure by Letters Patent is:—

1. In a hydraulic shock-absorber a casing, a compensating tank arranged thereon, valves between the tank and casing, partitions fixed within said casing dividing said casing into two compartments, oscillating blades arranged between said fixed blades, a horizontal perforated hub for said blades said perforations connecting together the compartments, a piston in said hub adjusting the size of the perforations, an axial screw-threaded rod in the hub, an axial screw driving rod arranged in a water-tight manner against said axial rod, and means for attaching said hub to the movable body whose shocks are to be absorbed.

2. In a hydraulic shock-absorber a casing, a compensating tank arranged thereon, valves between the tank and casing, partitions fixed within said casing dividing said casing into two compartments, oscillating blades arranged between said fixed blades, a horizontal perforated hub for said blades said perforations connecting together the compartments, a screw-threaded rod arranged within said hub, a piston terminating one end of said rod and adapted to regulate the section of said perforations, a tapped portion within said hub, said screw-threaded rod fitting within said tapped portion, a screw driving rod adapted to operate said screw-threaded rod, a washer inserted between the screw driving rod and the end of the hub, a crank on said hub for attaching said hub to the movable body whose shocks are to be absorbed and a nut adapted to hold said screw driving rod and washer and said crank.

3. In a hydraulic shock-absorber a casing, a compensating tank arranged thereon, valves between the tank and casing, partitions fixed within said casing dividing said casing into two compartments, oscillating blades arranged between said fixed blades, a horizontal perforated two-part hub for said blades said perforations connecting together the compartments, two screw-threaded rods arranged within said hub, pins in said fixed partitions projecting into said perforations, pistons terminating one end of said rods and adapted to regulate the sections of said perforations, tapped portions within said hub, said screw-threaded rods fitting within said tapped portion, screw driving rods adapted to operate each screw-thread, a washer inserted between each screw driving rod and the ends of the hub, cranks on said hub for attaching the two parts of said hub to the movable body whose shocks are to be absorbed and nut adapted to hold each screw driving rod and washer and each crank.

In testimony whereof I have signed my name to this specification in the presence of the subscribing witnesses.

MAURICE HOUDAILLE.

Witnesses:
 VICTOR DUPONT,
 GEORGES BONNEUIL,
 H. C. COXE.